(12) United States Patent
Akgün et al.

(10) Patent No.: US 8,070,197 B2
(45) Date of Patent: Dec. 6, 2011

(54) ENERGY ABSORPTION DEVICE

(75) Inventors: Toros Akgün, Graz (AT); Michael Blümel, Flatz (AT)

(73) Assignee: Cosma Engineering Europe AG, Oberwaltersdorf (AT)

( * ) Notice: Subject to any disclaimer, the term of this patent is extended or adjusted under 35 U.S.C. 154(b) by 258 days.

(21) Appl. No.: 12/517,827

(22) PCT Filed: Nov. 27, 2007

(86) PCT No.: PCT/EP2007/010386
§ 371 (c)(1),
(2), (4) Date: Jun. 5, 2009

(87) PCT Pub. No.: WO2008/067951
PCT Pub. Date: Jun. 12, 2008

(65) Prior Publication Data
US 2010/0320782 A1    Dec. 23, 2010

(30) Foreign Application Priority Data

Dec. 8, 2006  (DE) .................. 10 2006 057 993
Dec. 8, 2006  (DE) .................. 20 2006 018 616 U

(51) Int. Cl.
*B60R 19/34* (2006.01)
(52) U.S. Cl. .................. 293/133; 293/155; 296/187.1; 188/377

(58) Field of Classification Search ............... 293/133, 293/155; 296/187.1; 188/371, 377
See application file for complete search history.

(56) References Cited

U.S. PATENT DOCUMENTS

| 3,912,295 | A  | * | 10/1975 | Eggert, Jr. ............ 280/784 |
| 6,702,345 | B1 |   | 3/2004  | Yoshida |
| 6,802,548 | B2 | * | 10/2004 | Shimotsu ............. 293/133 |
| 7,070,217 | B2 | * | 7/2006  | Longo ................. 293/132 |
| 2002/0167183 | A1 | | 11/2002 | Shimotsu |
| 2004/0169383 | A1 | | 9/2004  | Shimotsu |

FOREIGN PATENT DOCUMENTS

| DE | 1931844 A1 | 4/1970 |
| DE | 10324403 A1 | 2/2004 |
| EP | 1714834 A | 10/2006 |

* cited by examiner

*Primary Examiner* — Dennis Pedder

(57) ABSTRACT

The present invention relates to an energy absorption device (1) for a bumper arrangement of a vehicle, with a hollow longitudinal section (2) intended for deformation, a rolled-back region (3) adjoining the hollow longitudinal section, and an extension section (4) connected to the rolled-back region. In order to improve an energy absorption device of this type to the extent that obliquely acting accident forces can be absorbed with a high degree of efficiency in as simple a manner as possible, it is proposed, in an initial state prior to energy absorption, to orient the hollow longitudinal section (2) obliquely with respect to the axial direction of the extension section (4).

16 Claims, 15 Drawing Sheets

ENERGY ABSORPTION DEVICE

CROSS-REFERENCE TO RELATED APPLICATIONS

This application is a national entry application of PCT Application WO 2008/067951 filed on Nov. 29, 2007, entitled "Energy Absorption Device" which claims priority from German Utility Model No. 20 2006 018 616 filed on Dec. 8, 2006, entitled "Energieabsorptionsvorrichtung" (Energy Absorption Device), and German Patent No. 10 2006 057 993 filed on Dec. 8, 2006 entitled "Energieabsorptionsvorrichtung" (Energy Absorption Device), the disclosures of which are incorporated herein by reference for all purposes.

FIELD OF THE INVENTION

The present invention relates to an energy absorption device.

BACKGROUND OF THE INVENTION

The present invention relates to an energy absorption device with a first hollow longitudinal section with a first horizontal cross section width and a second hollow longitudinal section with a second horizontal cross section width, as well as a rolled-back transition section between the two hollow longitudinal sections.

Energy absorption devices of this type are used in vehicles and, located, for example, between bumper and chassis. In an accident, they plastically deform and thereby absorb energy. In light accidents, the ability to absorb energy can be sufficient in order to prevent a plastic deformation of the chassis.

In order to guarantee faultless deformation, i.e. telescoping together, the energy absorption device is mounted parallel to the longitudinal direction of the vehicle.

In practice however, accidental forces can occur that are active oblique to the longitudinal direction of the vehicle. In such a case it can happen that the hollow longitudinal section of the energy absorption device positions itself oblique relative to the hollow longitudinal section. In order to control such an oblique position, i.e. to align both hollow longitudinal sections straight again with respect to each other, from DE 103 24 403 A1 a specific design of the transition section is known. On the outside of the transition section, a large, U-shaped curve is provided. Against it, the inner hollow longitudinal section comes to abut and when it is telescoped together it is aligned straight again. An inner U-shaped curve of the transition section is designed with a small radius, as a result of which the inner hollow longitudinal section is always mounted close to the outer, large curve.

A similar arrangement in which a hollow longitudinal section on the side of the bumper is straightened again is known from U.S. Pat. No. 6,702,345 B1.

One possibility for absorbing obliquely acting accident forces is known from U.S. Pat. No. 6,802,458 B2. Here, a generic energy absorption device is used, which is aligned at oblique to the longitudinal direction of the vehicle. Thus an oblique accident force acts in longitudinal direction in the energy absorption device, whereby it can faultlessly telescope together.

U.S. Pat. No. 6,802,548 B2 proposes the use of a cup-shaped shock absorption element, which is mounted before the energy absorption device on the bumper side. In the event of an obliquely acting accident force with respect to the longitudinal axis of the energy absorption device, with the help of the cup-shaped shock absorption element a pivoting of the hollow longitudinal section is prevented or at least largely minimized.

The present invention further concerns an energy absorption device for a shock absorption arrangement of a vehicle with a hollow longitudinal section designed for deformation, that is aligned oblique to the longitudinal direction of the vehicle and a section that follows it that is a rolled-back section at which the mounting plane of the energy absorption device is provided which defines the mounting plane of the energy absorption device.

From DE 19 31 844 A, an energy absorption device is known which is provided with a certain tube for deformation and a following rolled-back section to which an extension piece is connected which extends outward. The extension piece is mounted at a guide component that is designed as a circular disk. The extension piece and the guide piece are aligned parallel to the horizontal cross section plane of the tube. In this manner, the tube can faultlessly deform rolling back and project through the opening of the guide component.

SUMMARY OF THE INVENTION

The present invention relates to an energy absorption device with a first hollow longitudinal section with a first horizontal cross section width and a second hollow longitudinal section with a second horizontal cross section width, as well as a rolled-back transition section between the two hollow longitudinal sections.

The present invention is based on the objective of improving a generic energy absorption device in such a way that in as simple a way as possible, obliquely acting accident forces can be absorbed with a high degree of efficiency, as well as a process for manufacturing such an energy absorption device.

The problem is solved in accordance to the invention with an energy absorption device with the characteristics of the claims.

With an oblique alignment of the hollow longitudinal section to the axial direction of the extension section, obliquely acting accident forces can be buffered well and absorbed. The deformation process runs surprisingly faultlessly and a similarly a high degree of flow of force can be achieved as in the energy absorption devices in which the axial direction of the extension section is aligned parallel to the axial direction of a hollow longitudinal section.

Advantageously, the axial direction of the hollow longitudinal section or the extension section can be aligned oblique to the longitudinal direction of the vehicle and the axial direction of the respectively other section essentially parallel to the longitudinal direction of the vehicle. Thereby, oblique accident forces can be buffered easily and the forces can still be introduced relatively straight into the vehicle chassis, for example, into a longitudinal carrier of the chassis, at which the energy absorption device can be mounted.

Especially preferred, the hollow longitudinal section can be aligned oblique by approximately 5° to 20° with respect to the axial direction of the extension section, preferably by approximately 8° to 12°, particularly preferred by approximately 10°. In this way, oblique accident forces can be buffered well and absorbed well and in spite of that, even forces acting parallel to the longitudinal direction of the vehicle can still be buffered and absorbed.

Particularly favorably, a guide can be provided on which the hollow longitudinal section rolls off during deformation. In this way, a telescoping motion with a high degree of stability results.

The problem is also solved according to the invention with an energy absorption device with the characteristics of the claims.

With the oblique alignment of the horizontal direction of the hollow longitudinal section with respect to the mounting plane, accident forces acting oblique to the longitudinal direction of the vehicle can be absorbed well. The deformation process is surprisingly faultless and an approximate efficiency factor in energy absorption can be achieved as it is possible in energy absorption devices in which the mounting plane is aligned parallel to the horizontal direction of the hollow longitudinal section.

Advantageously, the mounting plane can be aligned approximately perpendicular to the longitudinal direction of the vehicle. Thereby, the hollow longitudinal section is aligned oblique to the longitudinal direction of the vehicle and can, for the most part, accept oblique accident forces corresponding to its longitudinal direction. By way of the mounting section, the remaining forces can, to a large extent, be passed on in the longitudinal direction of the vehicle.

Preferably, the rolled-back region can be designed at an end section of the energy absorption device. Thus, the rolled-back deformation of the hollow longitudinal section begins at the end of the energy absorption device.

Particularly favorable, the energy absorption device can be mountable in the direction of the longitudinal section approximately at approximately the height of the rolled-back section at a chassis structure. In this way, the energy absorption device can be mounted with a high degree of stability. Moreover the alignment of the hollow longitudinal section can adapt well to those accident forces, the direction of which deviates from the original direction of its longitudinal direction.

Particularly advantageously, the rolled-back section can have an only U-shaped roll-back shape. Thus, the transition form the longitudinal section to the mounting section is simple and can also be realized in a narrower space.

Particularly preferred, the mounting section can be designed like a flange, like a flap or a collar. Thus, the energy absorption device can be easily and 2-dimensionally mounted on a vehicle.

Particularly favorable can be a vehicle structure with an energy absorption device with at least one of the previously mentioned designs, whereby the vehicle structure has a cladding which forms a guide for the hollow longitudinal section, on which such can be rolled off during deformation. In this way, existing structures of a vehicle are usable for guided telescoping of the hollow longitudinal section, for example, a longitudinal carrier, especially an interior space of such. By rolling off, the contact of cladding and rolling-back longitudinal section works faultlessly.

Moreover, the problem is solved according to the invention, with an energy absorption device with the characteristics of the claims.

With the oblique alignment of the hollow longitudinal sections, obliquely acting accident forces can be buffered and absorbed well. Thereby, surprisingly a similarly a high degree of progression of force as in the energy absorption devices with longitudinal sections that are aligned straight is achieved, i.e. a high degree of efficiency in energy absorption is achieved.

Preferably, that hollow longitudinal section that has greater roll-back-capability can be aligned oblique to the direction of the vehicle. In this way, an oblique accident force can be absorbed especially efficiently. The longitudinal section designated for deformation can accept the accident force in its longitudinal direction.

Particularly favorably, the hollow longitudinal section with smaller horizontal cross section width can be the more capable of rolling back hollow longitudinal section of the energy absorption device. In this way, the hollow longitudinal section with larger horizontal cross sectional width can be used for stabilization; it has, as it were, the broader support structure.

Particularly advantageously, the hollow longitudinal section with larger horizontal cross sectional width can form a guide for the hollow longitudinal section with smaller horizontal cross sectional width. While telescoping together, the longitudinal section with smaller horizontal cross-sectional width can support itself at the longitudinal section with larger horizontal cross-sectional width and roll off on it. In this way, a telescoping motion results with a high degree of stability.

The problem is solved further with a process with the characteristics of the claims.

With this process, an energy absorption device with obliquely aligned hollow longitudinal sections can be manufactured simply and with a high degree of precision, particularly concerning the angularity of the hollow longitudinal sections to one another.

Particularly advantageously, the tube of first horizontal cross section width can be enlarged in sections to the second horizontal cross section width with the help of an interior high pressure deformation. As a result of this, the longitudinal section of larger horizontal cross section width can be manufactured with a high degree of precision and simultaneously strengthened by the deformation; this means that it receives a higher deformation resistance.

BRIEF DESCRIPTION OF THE DRAWINGS

Exemplary embodiments of the invention will now be described in conjunction with the following drawings wherein like numerals represent like elements, and wherein.

DETAILED DESCRIPTION OF THE PREFERRED EMBODIMENTS

Figure 1:
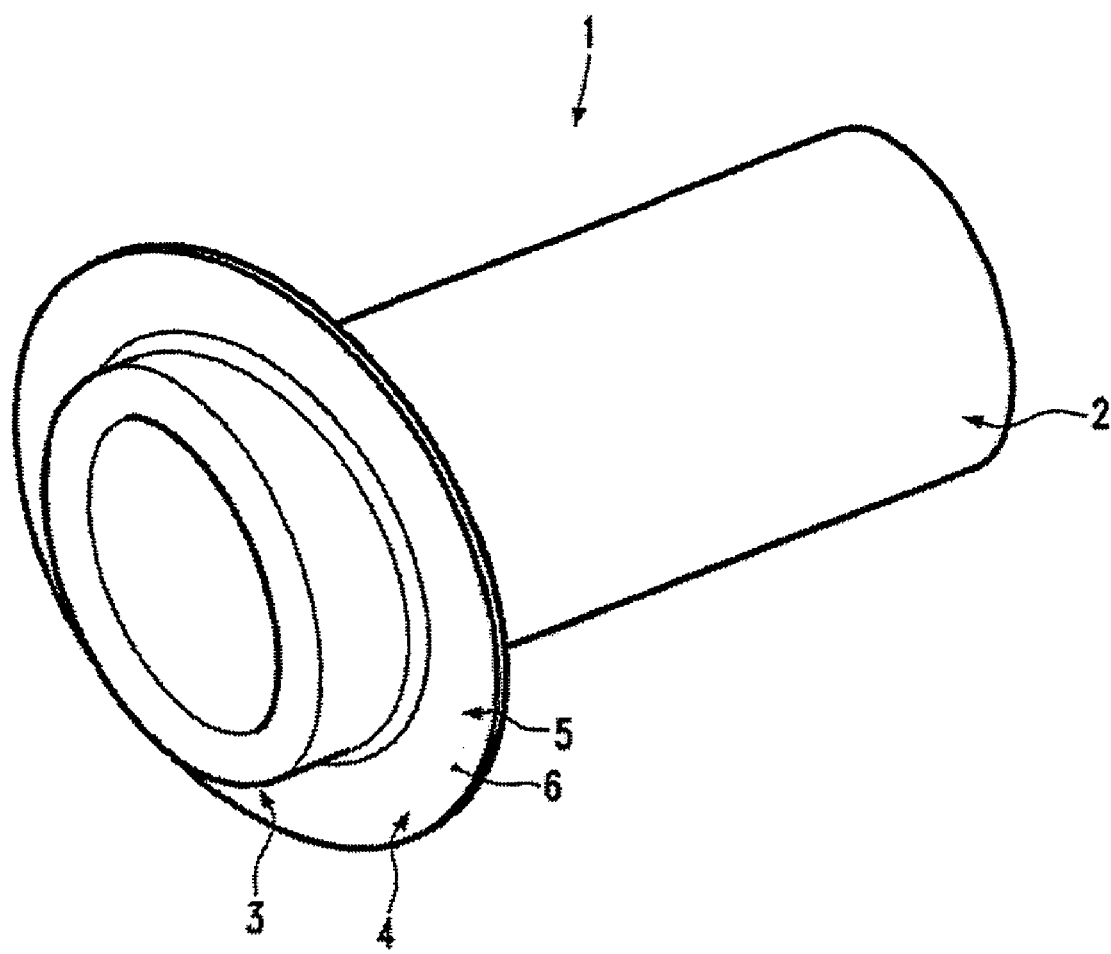
FIG. 1 shows a perspective view of an energy absorption device of a first embodiment of the invention.

FIG. 1 shows an energy absorption device 1 of a first embodiment of the invention shown in a perspective view. The energy absorption device 1 has a hollow longitudinal section 2 that is designated for deformation. Following the hollow longitudinal section 2 is a rolled-back section 3, at which a mounting section 4 is provided as extension section. The mounting section defines a mounting plane of the energy absorption device 1.

In this embodiment of the invention, the mounting section 4 is designed approximately flange-like and the mounting plane 5 is specified by an abutment surface 6 of the mounting section 4 on the side of rolled-back section 3.

It is also possible to design the mounting section like a flap or a collar.

The hollow longitudinal section 2 is shaped like a tube in this embodiment of the invention. However, other open or closed hollow-body-like forms are also possible, for example, with an oblique horizontal cross section.

Figure 2:
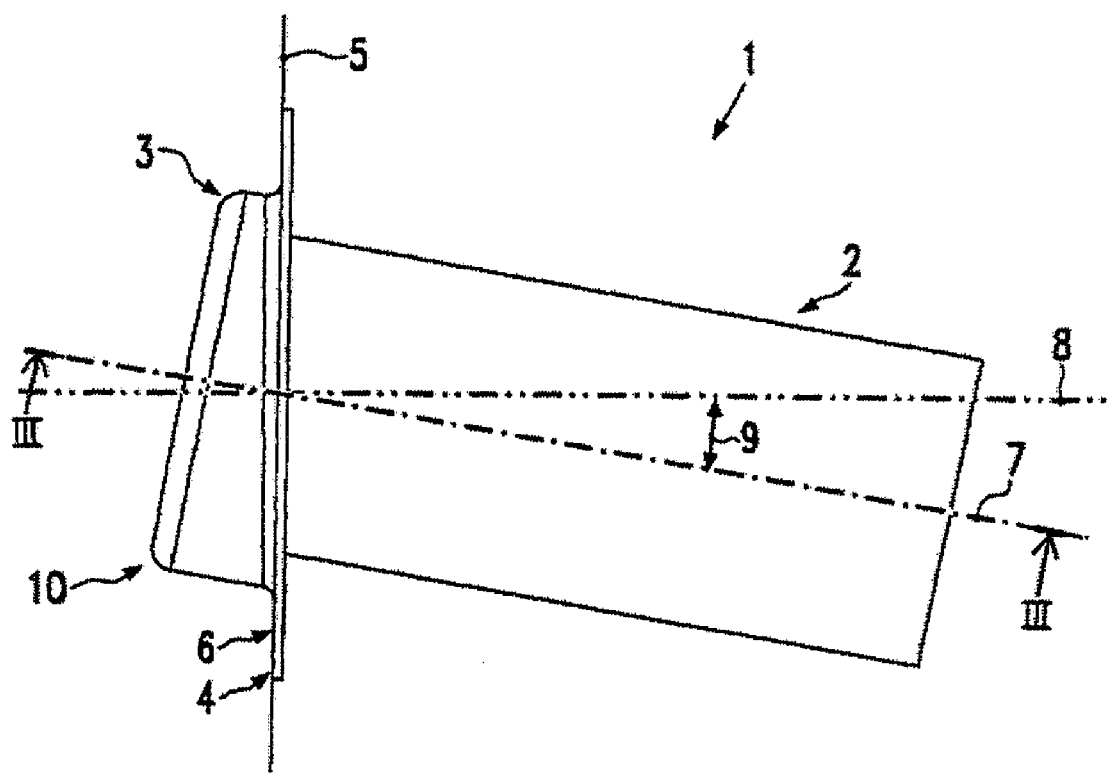
FIG. 2 shows a lateral view of an energy absorption device from FIG. 1.

In FIG. 2, the energy absorption device 1 is shown in a lateral view. From this illustration it can be seen particularly clearly that the mounting plane 5 is aligned oblique with respect to the horizontal direction of hollow longitudinal section 2. This means that it runs oblique to the—not shown—straight line perpendicular to longitudinal axis 7 of hollow longitudinal section 2. In other words, a normal 8 of mounting plane 5 runs oblique to longitudinal axis 7 of hollow longitudinal section 2. Thus, the hollow longitudinal section is aligned oblique to the axial direction of the mounting section. The normal 8 runs in axial direction of the mounting section.

The mounting plane and the horizontal direction make an angle of approximately 5° to 20°, preferably an angle of 8° to 12° and particularly preferred an angle of approximately 10°. In other words, the normal 8 and the longitudinal axis 7 of hollow longitudinal section 2 make an angle 9 of the previously described dimension. With this angularity oblique to the longitudinal direction of the vehicle acting accident forces can be buffered and absorbed particularly well, for example, accident forces that act oblique at 10° to the longitudinal direction of the vehicle. But accident forces that act parallel to the longitudinal direction of the vehicle can still be accepted well and absorbed.

Figure 3:
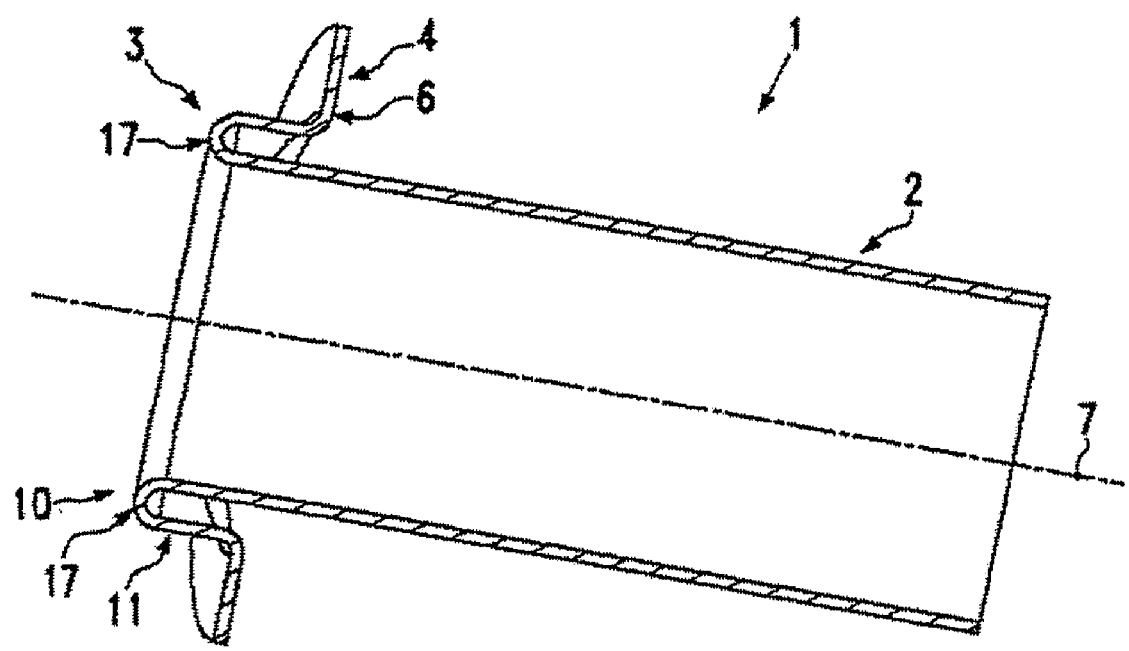
FIG. 3 shows a longitudinal cross section of the energy absorption device according to a line in FIG. 2.

In FIG. 3, a longitudinal cross section of the energy absorption device according to line in FIG. 2 is shown. It can be seen from this that the rolled-back section 3 that is designed in the end section 10 of the energy absorption device has a purely U-shaped rolled-back section with a U-arc 17. From the outer U-section 11, the rolled-back section 3 transitions directly into mounting section 4.

In this embodiment of the invention mounting section 4 starts in direct proximity of hollow longitudinal section 2. This means that the distance of the mounting section 4 to the hollow longitudinal section 2 is small compared to the width of the horizontal cross section of hollow longitudinal section 2. Moreover, the mounting section in the direction of the hollow longitudinal section is approximately at the height of the rolled-back region 3.

By providing mounting section 4 in the area of the end section 10 of the energy absorption device and close to the second hollow longitudinal section 2, the energy absorption device is stable and can be mounted directly on a vehicle structure. Thereby, an end that is located opposite to the rolled-back region 3 of the energy absorption device is sufficiently movable in order to adapt to the accident forces, whose direction runs oblique to the longitudinal axis 7 of the hollow longitudinal section. Above the rolled-back region 3, a pivoting of hollow longitudinal section 2 can be offset, whereby in a circumference section, a rolling-back deformation of the hollow longitudinal section can occur.

Figure 4:
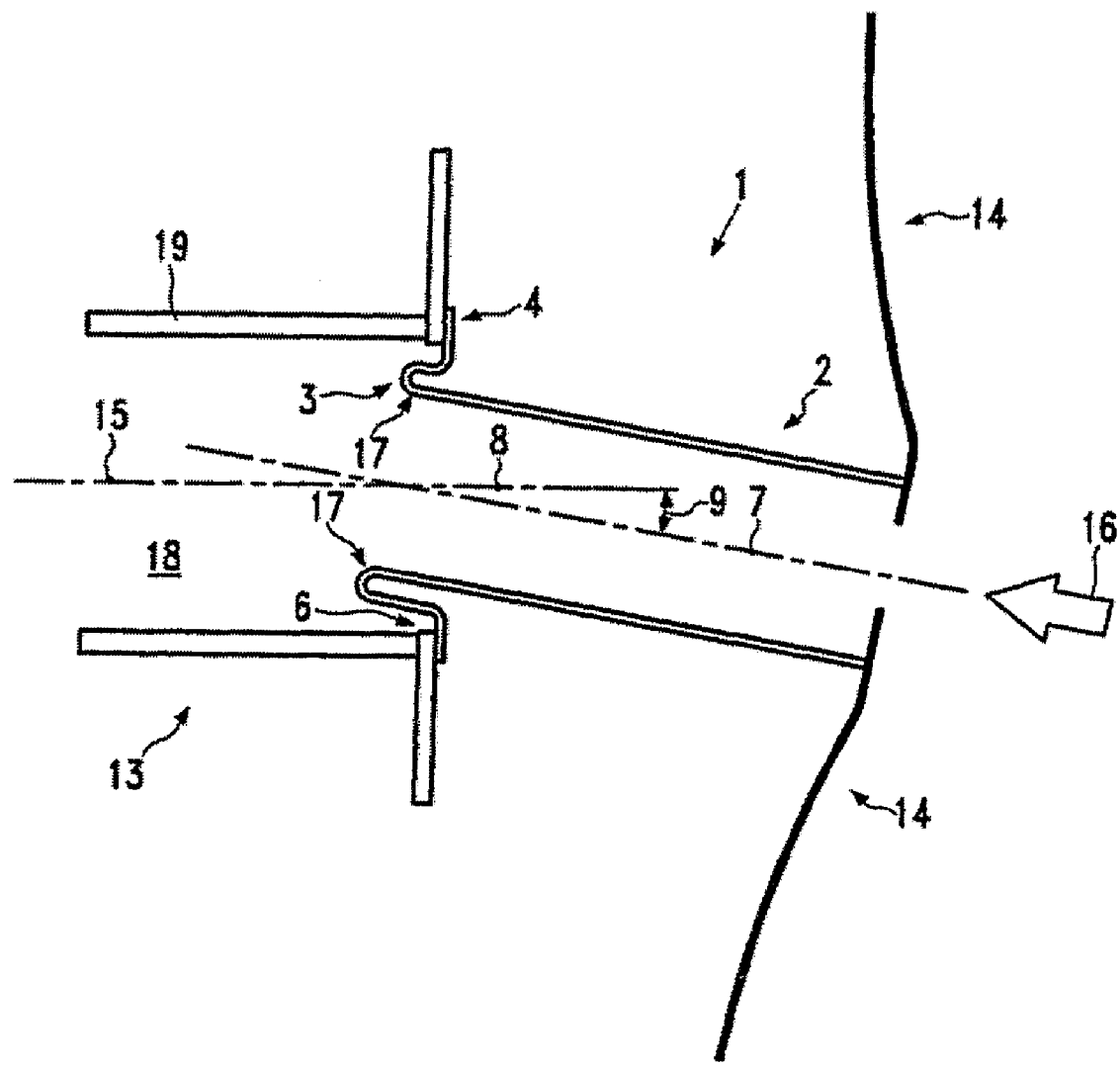
FIG. 4 is a schematic view of a bumper arrangement and a chassis structure with an energy absorption device that is located between such, whereby only the profiles of the cross section contours are shown.

FIG. 4 shows the energy absorption device schematically in a position that is mounted between the chassis structure 13 and the bumper arrangement 14. The chassis structure 13 can, for example, be a longitudinal carrier, whose longitudinal direction 15 runs parallel to the longitudinal direction of the vehicle.

The energy absorption device 1 is mounted on the chassis structure 13 in such a way that the normal 8 of mounting plane 5 and the longitudinal direction 15 of the chassis structure run parallel to one another. In this embodiment of the invention, they even coincide. Accordingly, the mounting plane 5 is aligned approximately perpendicular to the longitudinal direction of the vehicle and the longitudinal axis 7 of hollow longitudinal section 2 runs at the angle of the dimension mentioned, oblique to the longitudinal direction of the vehicle.

In FIGS. 1 to 4, the energy absorption device is shown in initial condition prior to an energy absorption. If, perhaps, an accident force 16 acts in the direction of the longitudinal axis 7 of hollow longitudinal section 2, the energy absorption device plastically deforms rolling back. Thereby, the U-arc 17 of the rolled-back region is bent and continually, new material of the deforming hollow longitudinal section 2 that is rolling-back forms an antecedent arc.

The hollow longitudinal section telescopes into a cavity 18 of the chassis structure 13. During progressive energy-absorbing telescoping into it, the leading curve comes to abut with a cladding 19 of chassis structure 13. The cladding 19 serves as support of the hollow longitudinal section and as guide for additional rolling-back deformation. The hollow longitudinal section can roll off from cladding 19 in rolling-back manner. For this reason, the contact with the cladding happens faultlessly.

The energy absorption device can be manufactured by a thermoforming process out of a flat material, for example out of a blank. In the process, a part of the flat material is used for designing the hollow longitudinal section 2 and the rolled-back region 3. A part of the flat material remains flat and is used for designing the mounting section 4.

Figure 5:
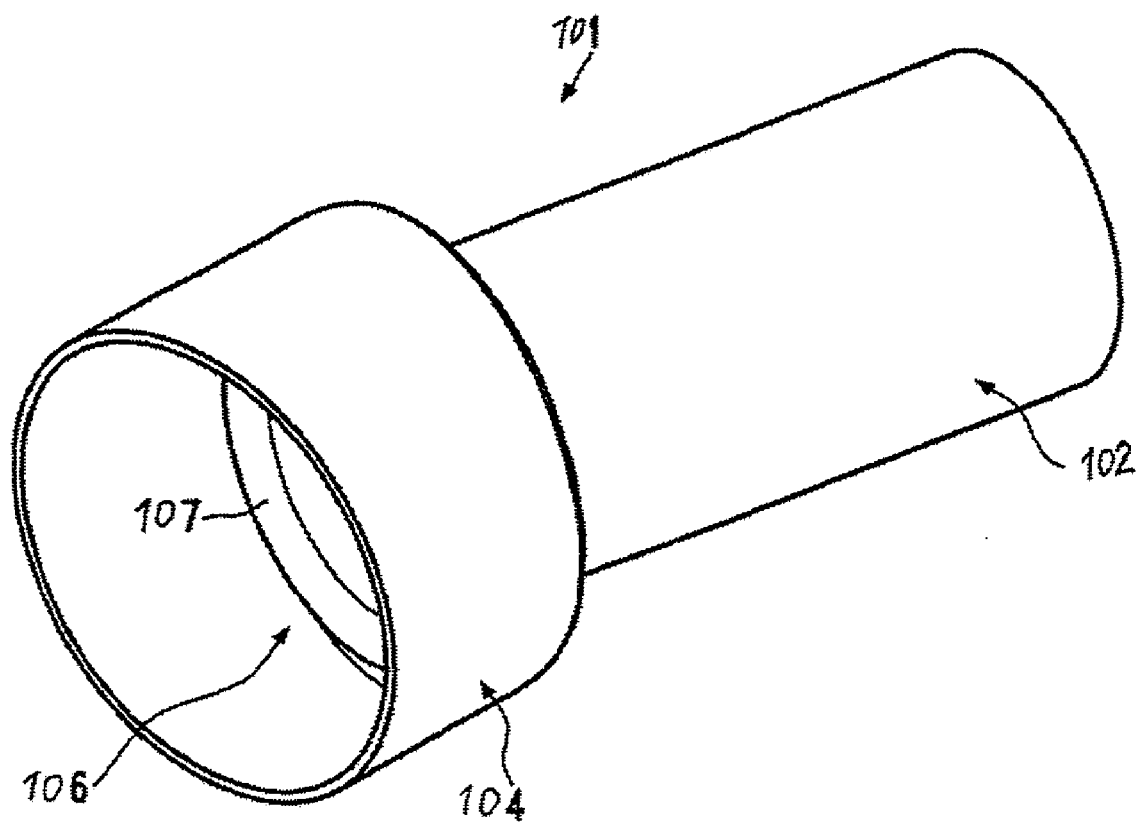
FIG. 5 shows a perspective view of an energy absorption device of a second embodiment of the invention.
Figure 6:
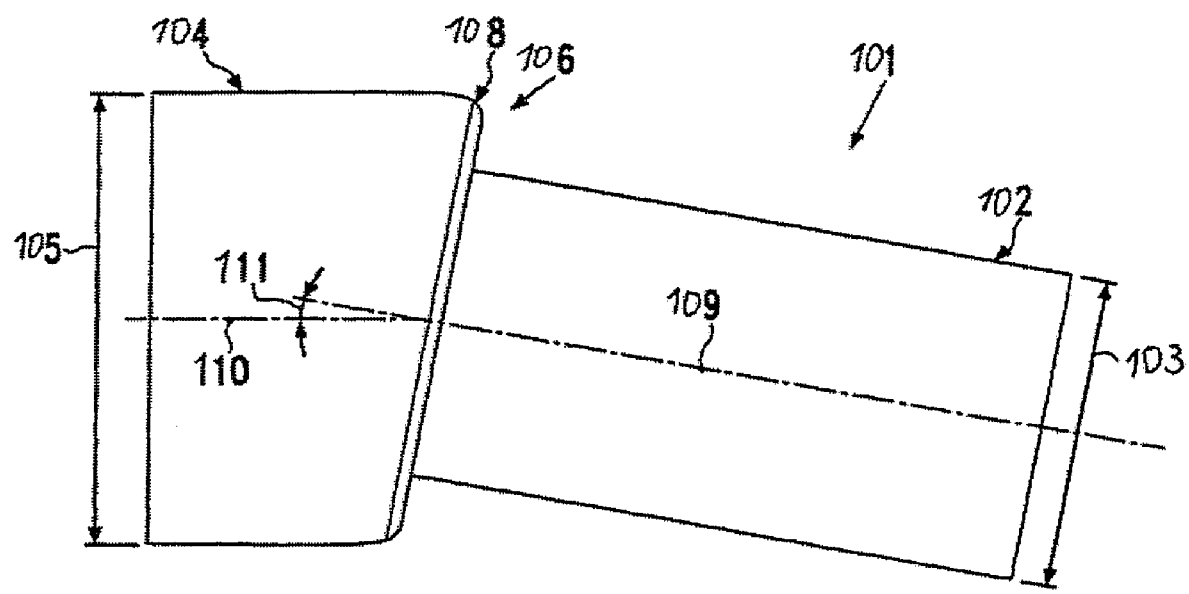
FIG. 6 shows a top view of the energy absorption device according to FIG. 5.
Figure 7:
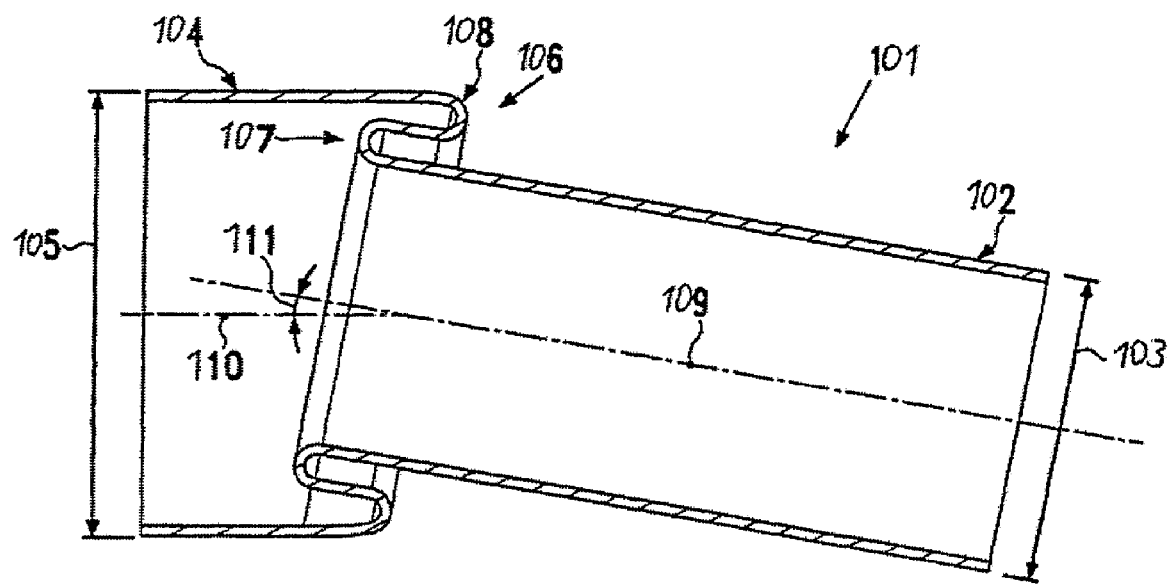
FIG. 7 shows a longitudinal cross section of the energy absorption device according to FIG. 6.

In FIG. 5, an energy absorption device 101 of a second embodiment of the invention is shown in a perspective view, in FIG. 6 in a top view and in FIG. 7 in a longitudinal cross section according to FIG. 6. The energy absorption device 101 has a first hollow longitudinal section 102, which has a first horizontal cross section width 103 and a second hollow longitudinal section 104, which has a second horizontal cross section width 105. In this example of an embodiment, the first horizontal cross section width 103 is smaller than the second horizontal cross section width 105.

The first and second hollow longitudinal section 102, 104 are designed tube-shaped in this embodiment. However, other open or closed hollow-body-like forms are also possible, for example with an angular horizontal cross section.

Between the two hollow longitudinal sections 102, 104, a rolled-back transition section 106 is designed.

One could also say that a rolled-back region follows a hollow longitudinal section that is designated for deformation, which is connected to an extension section. Depending on the embodiment, the first hollow longitudinal section or the second hollow longitudinal section can be the extension section.

The rolled-back transition section has an essentially S-shaped or double-U-shaped longitudinal cross section profile, as can be seen in FIG. 7. A first U-arc 107 emanates from first hollow longitudinal profile 102 and is located within the second hollow longitudinal section 104. A second U-arc 108 starts at the second hollow longitudinal profile 104 and is located outside of the first hollow longitudinal section 102 and surrounds such.

The first hollow longitudinal section 102 and the second hollow longitudinal section 104 are oblique to one another, whereby their longitudinal axis 109, 110 are at an angle 111. Angle 111 is selected in a range of approximately 5° to 20°, preferably in a range of approximately 8° to 12°, and particularly preferred in a range of approximately 10°. In this way, obliquely acting accident forces can be dissipated well, especially in accidents with approximately 10° incline to the longitudinal direction of the vehicle.

In this embodiment of the invention, the energy absorption device is designed in one piece.

Figure 8:
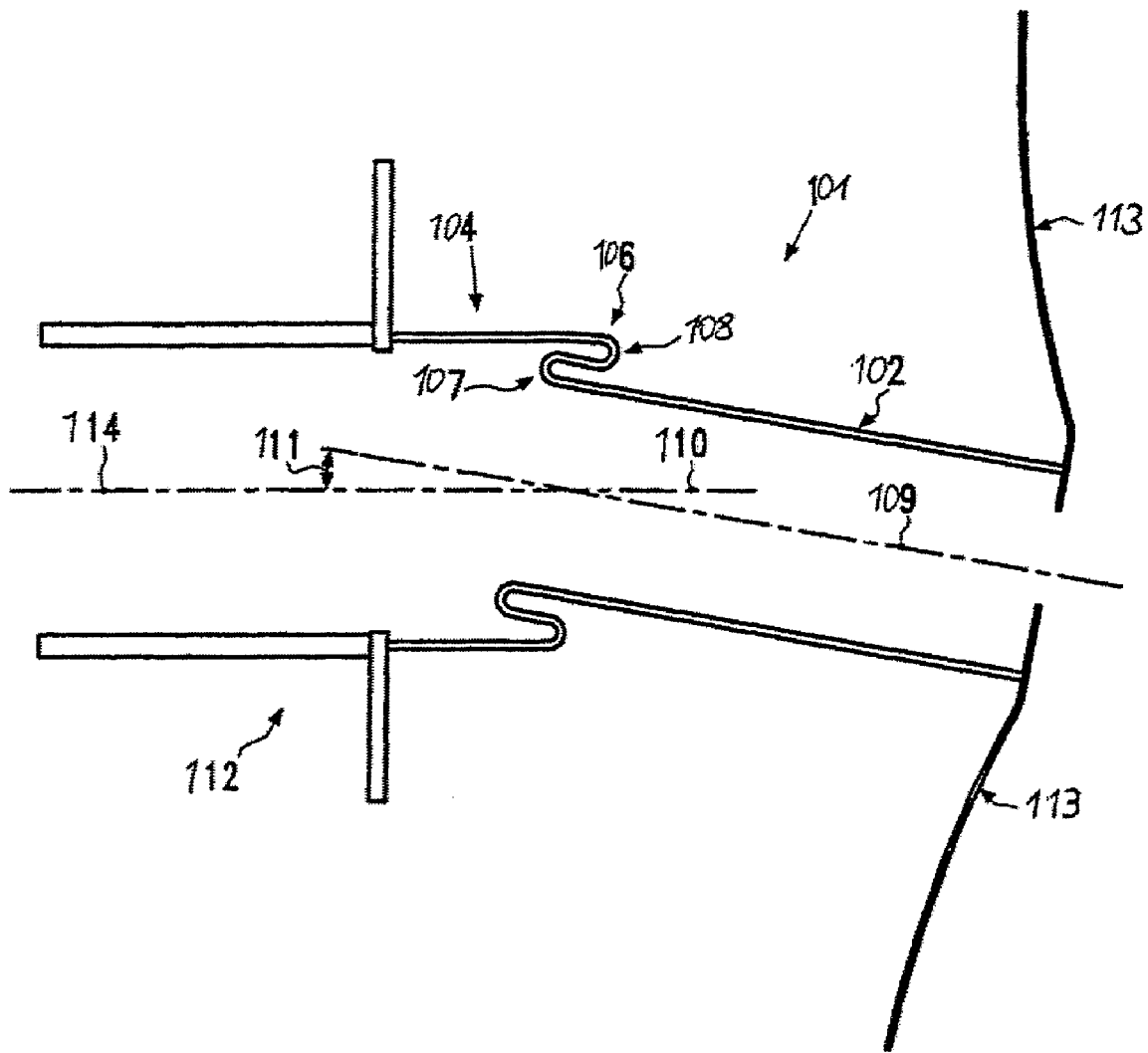
FIG. 8 shows a schematic representation of a chassis structure and a bumper arrangement of a vehicle with an energy absorption device that is provided between such according to FIG. 5, whereby cross section contours are shown.

In FIG. 8 it is illustrated, how the energy absorption device 101 can be mounted in a vehicle. In the present example of an embodiment, it is provided between a chassis structure 112 and a bumper arrangement 113. Thereby, the illustration in FIG. 8 is a schematic view of the longitudinal cross section profiles.

The bumper arrangement 113 can be a horizontal carrier or a horizontal profile of a bumper, and the chassis structure 112 can be a longitudinal carrier of a vehicle chassis. In this example of an embodiment, the second hollow longitudinal section with larger horizontal cross section width is mounted at the chassis structure 112, and its longitudinal axis 110 runs parallel to the longitudinal axis 114 of the chassis structure 112, whereby these two longitudinal axes 110, 114 coincide in this embodiment of the invention.

The longitudinal axis 114 of the chassis structure 112 runs parallel to the longitudinal direction of the vehicle. Thus, the first hollow longitudinal section 102 with smaller horizontal cross section width is mounted oblique to the longitudinal direction of the vehicle. The longitudinal axis 109 of the first hollow longitudinal section consequently makes the same angle with the longitudinal direction of the vehicle as in the longitudinal axis 110 of the second hollow longitudinal section 104.

Embodiments are also possible in which the longitudinal axis of the hollow longitudinal section with smaller horizontal cross section width runs parallel to the longitudinal axis of the chassis structure and it is mounted on such. The hollow longitudinal section with larger horizontal cross section width would then be located running obliquely to the longitudinal direction of the vehicle.

In the present embodiment of the invention, the first hollow longitudinal section that is located on the bumper side has a higher capability of rolling back than the second hollow longitudinal section that is mounted on the chassis side. Hereby, the energy-absorbing deformation of the energy absorption device 101 takes place essentially at the expense of the first hollow longitudinal section 102. This means that in this embodiment of the invention, the second hollow longitudinal section is the extension section.

Figure 9:
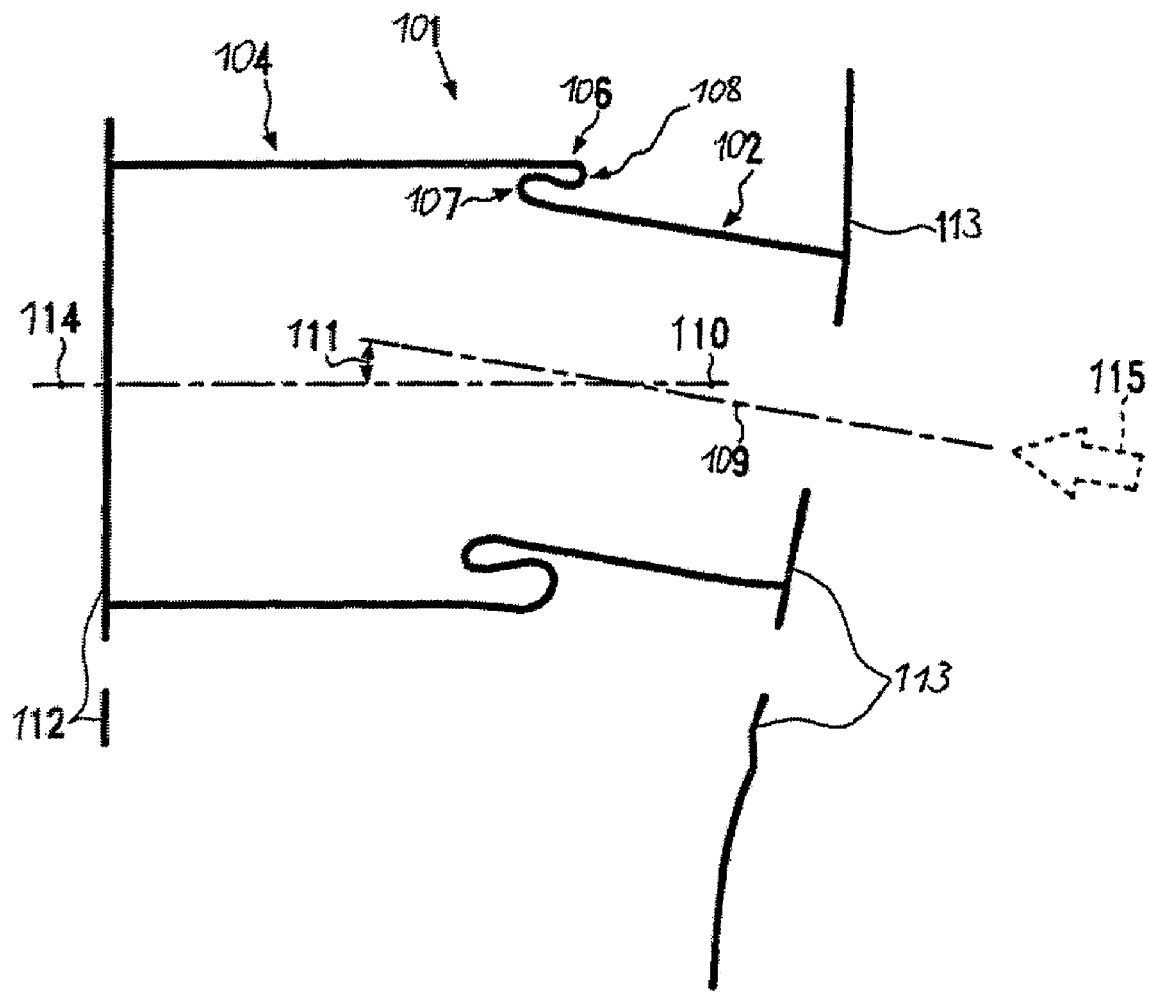
FIGS. 9 to 11 show simultaneous representations of the energy absorption device according to FIG. 8 in an initial condition, a first deformation condition and a second deformation condition.
Figure 10:
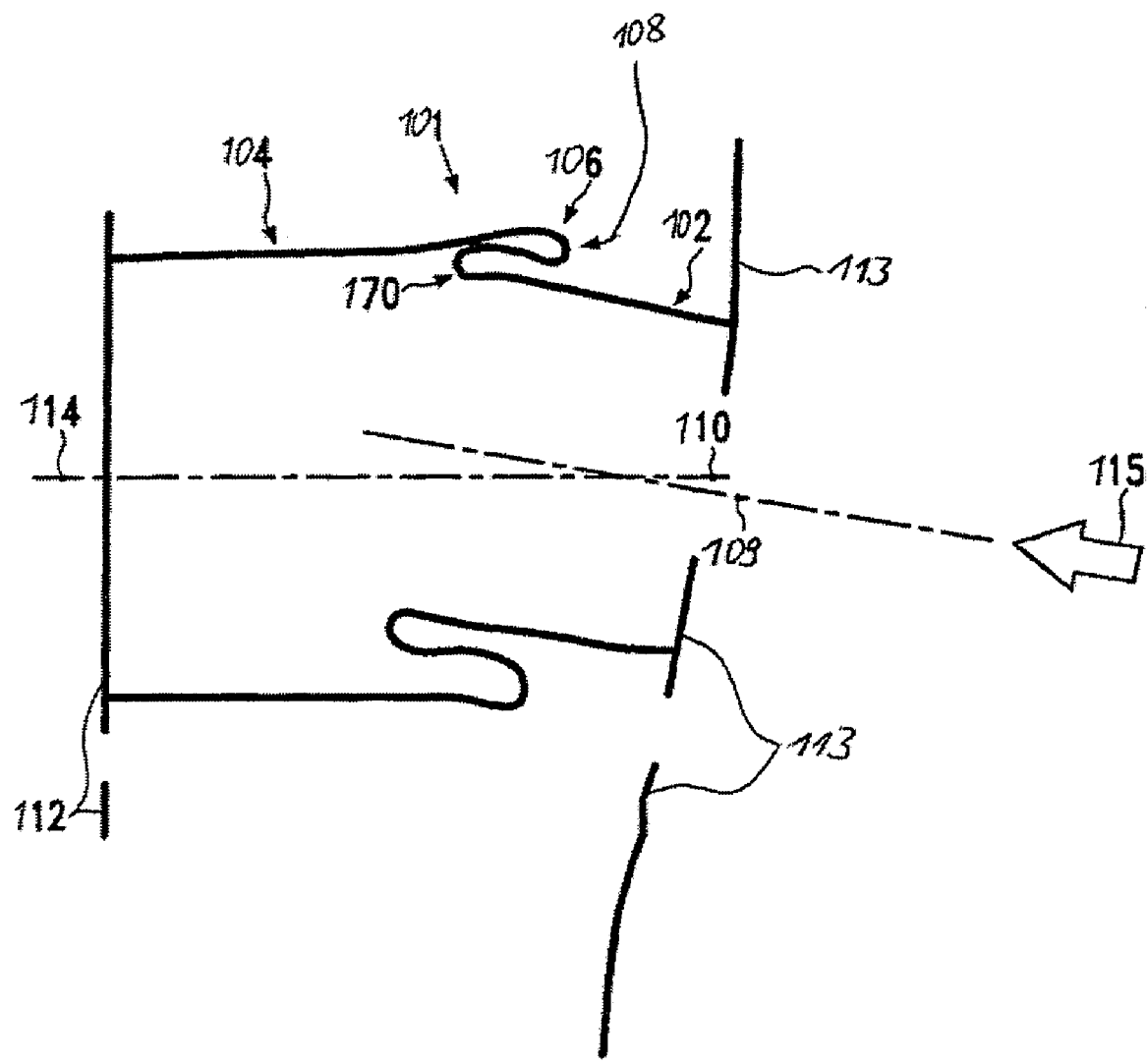
Figure 11:
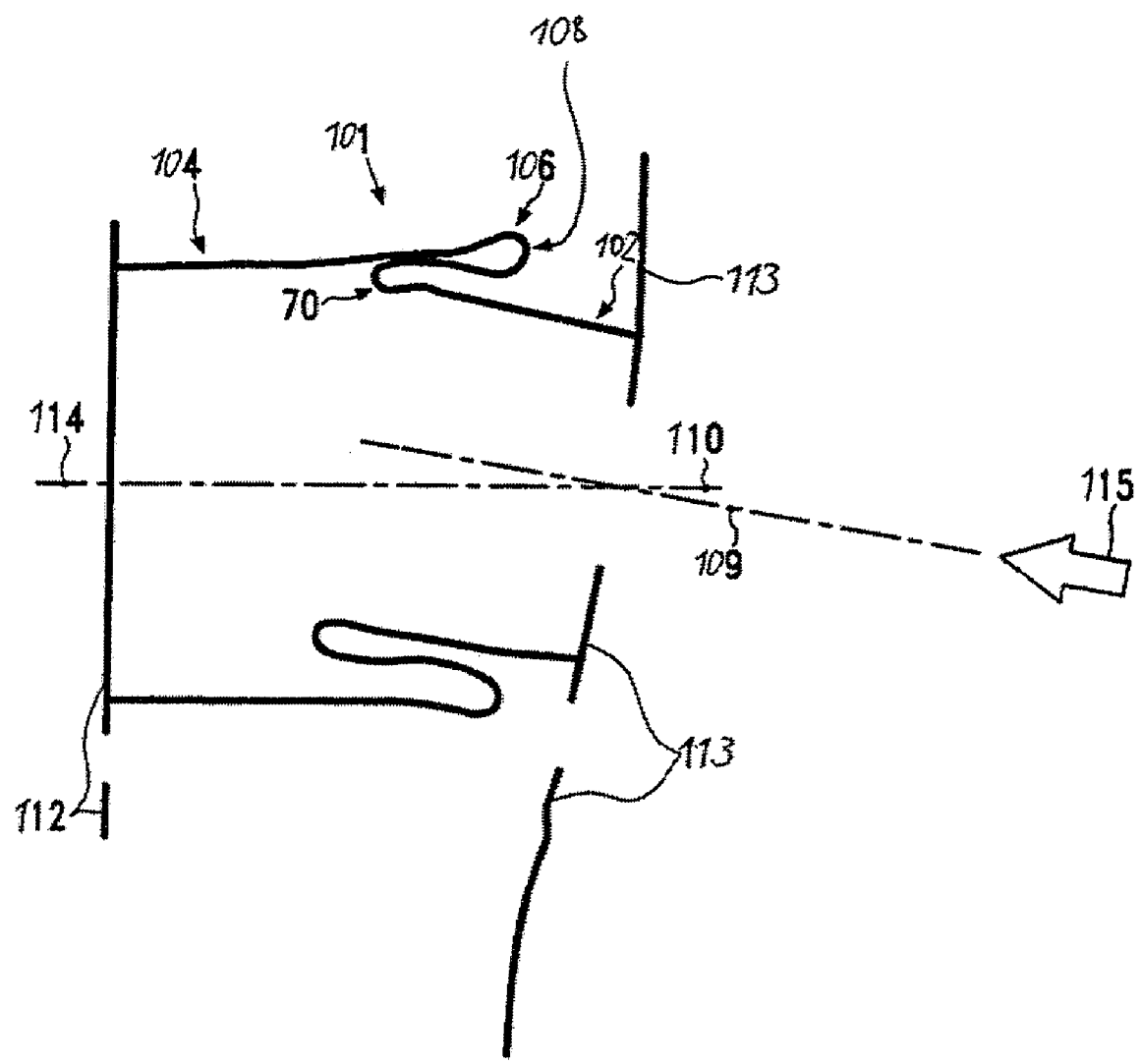

With this arrangement, accident forces acting oblique to the longitudinal direction of the vehicle, particularly perhaps accident forces acting in longitudinal direction 109 of the first hollow longitudinal section 102 are especially well absorbed, as can be seen in the schematic illustrations of simulations in FIGS. 9 to 11. The chassis structure 112 and the bumper arrangement 113 are illustrated—conditionally interrupted by the simulation model—and the chassis structure is rendered in a structure that runs horizontal to the second hollow longitudinal section.

FIG. 9 shows energy absorption device 101 in an initial condition prior to absorption of the accident energy, i.e. in the condition as it is shown in FIGS. 5 to 8.

When an accident force acts, the first hollow longitudinal section 102 begins to deform plastically rolling-back from U-arc 107. The more the direction of the accident force coincides with the longitudinal axis of the first hollow longitudinal section 102, the more the circumference section of first hollow longitudinal section 102—which starts immediately—deforms by rolling back.

A deviation of the direction of the accident force 115 from the direction of the longitudinal axis 109 of the first longitudinal section 102 is compensated by the quasi lose mounting of the transition area by a rolling-back deformation, which at first takes place in only one circumference section.

When it telescopes together, the first U-arc 107 of transition section 106 is bent and always new material of the first hollow longitudinal section 102 now forms an antecedent arc 170. This reaches the interior side of the second hollow longitudinal section 104. The second hollow longitudinal section 104 thereby forms a guide for first hollow longitudinal section 102. Thereby, the first longitudinal section rests on the second hollow longitudinal section and rolls off on such, as it is shown in FIGS. 10 and 11.

The accident force that is absorbed by the obliquely aligned first hollow longitudinal section 102 is introduced by the second hollow longitudinal section still relatively straight into the chassis structure 112. With its larger horizontal cross section width 105, the second hollow longitudinal section 104 is thereby stabilized well.

In spite of using an energy absorption device in which the hollow longitudinal sections are aligned oblique to one another, surprisingly, during the energy absorption a high degree of flow and a high degree of progression of force is achieved. The progression of force and the efficiency of the energy absorption lie in a similar range as in energy absorption devices in which the hollow longitudinal sections are aligned straight with respect to one another.

Figure 12:
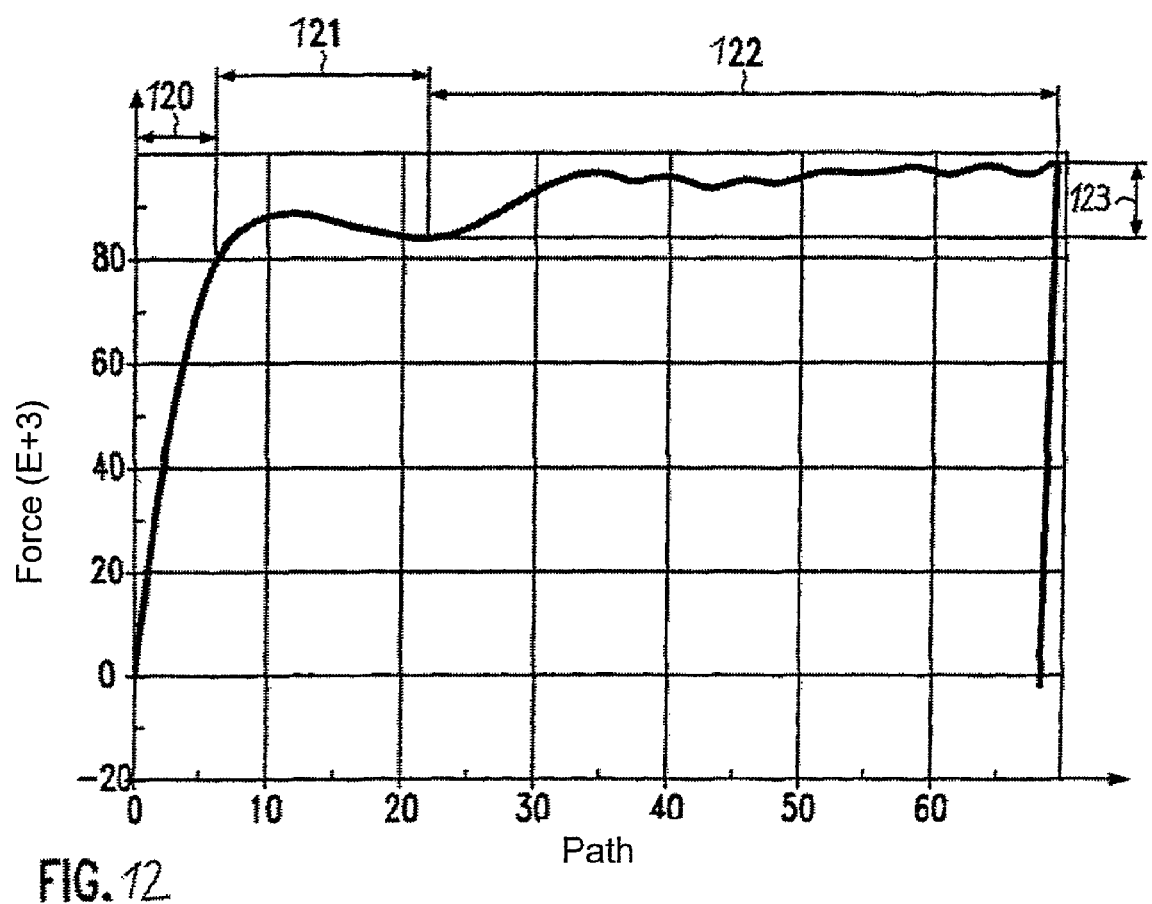
FIG. 12 shows a force path diagram of the course of the deformation of the energy absorption device.

In FIG. 12, a force flow diagram is shown for the energy absorption device in accordance with the invention. The abscissa axis represents the path of the approaching of the outer ends of the energy absorption device and the ordinate, the force that is applied to these ends. A first section of the path 120 contains the Hook range. With the transition into the second path section 121, the plastic deformation of the energy absorption device starts. In the course of the second path section 121, the expenditure of force increases by sections and, and thereafter falls again somewhat. This increased expenditure of energy is required for the bending of the original first U-arc 107.

After the expenditure of energy falls in the second path section 121, the expenditure of energy significantly increases in a third path section 122 by an amount identified by legend 123.

This increase in expenditure of energy is required for the deformation of the inner, first hollow longitudinal section 102 by rolling back subject to an enlargement of diameter.

In the following, processes in accordance with the invention for manufacturing a one piece energy absorption device 101 of the second embodiment of the invention are described.

Figure 13:
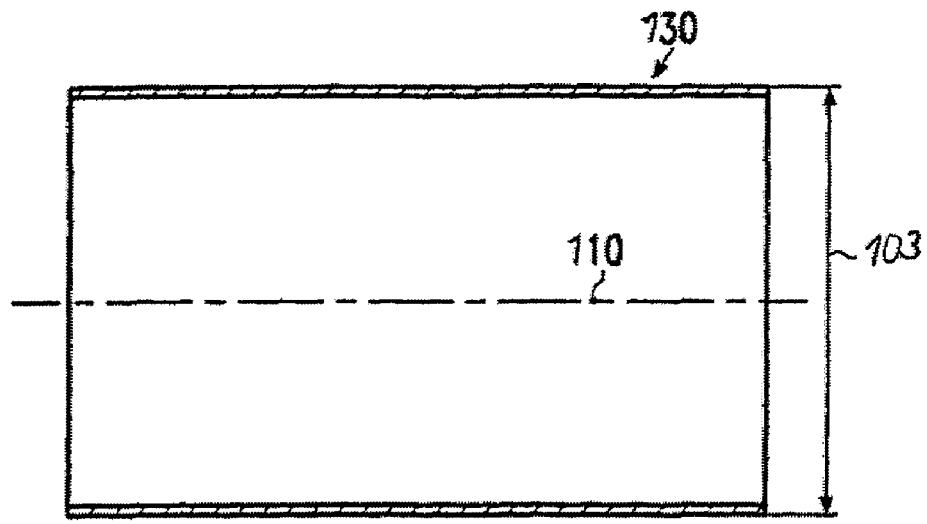
FIG. 13 shows a longitudinal cross section of a tube that serves as starting material for the manufacture of the energy absorption device according to the invention as per FIG. 5.
Figure 14:
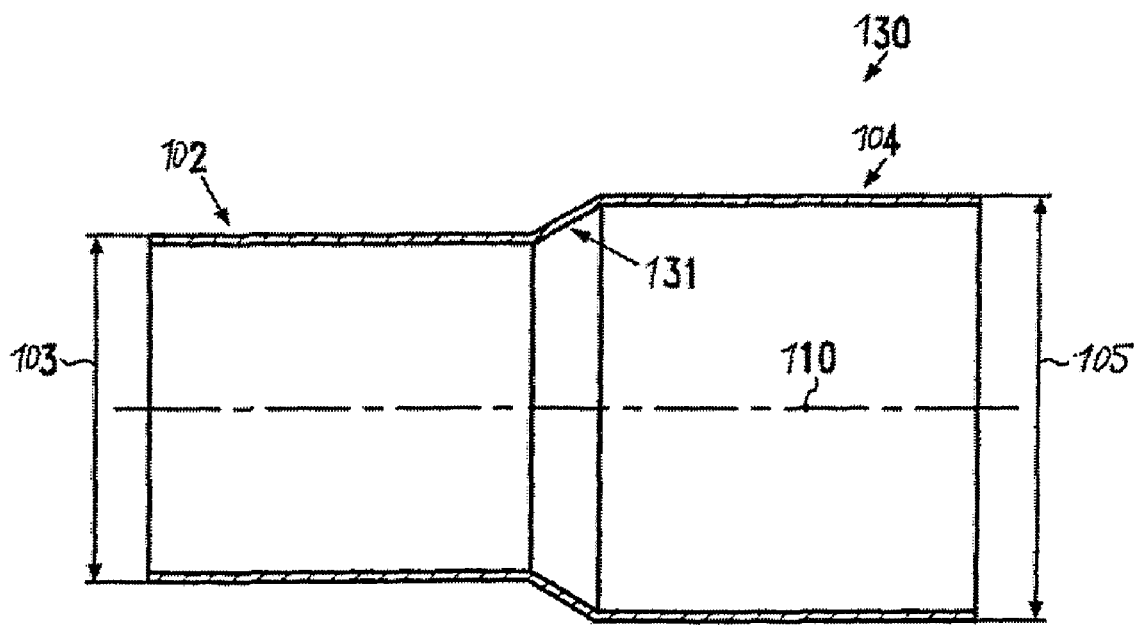
FIG. 14 shows an illustration of the tube from FIG. 13 after an interior high pressure deformation according to the first embodiment of a manufacturing process according to the invention.

In FIG. 13, a tube 130 with first horizontal cross section width 103 is shown which is used in the first embodiment of the manufacturing process according to the invention. With a high interior pressure deformation process, the horizontal cross section width of tube 130 is enlarged in sections. Thereby, a cone-shaped—in longitudinal cross section—transition section 131 is formed between the thus created hollow longitudinal sections 102, 104, as is shown in FIG. 14.

The two hollow longitudinal sections 102, 104 are not pressed toward one another in longitudinal direction, i.e. the cone-shaped transition section 131 is compressed, whereby an S-shaped or double-U-shaped transition section is created. Subsequently, the hollow longitudinal sections 102, 104 are brought into an angled alignment with one another with a tool, whereby the transition section plastically transforms and takes on the form shown in FIGS. 5 to 7.

Figure 15:
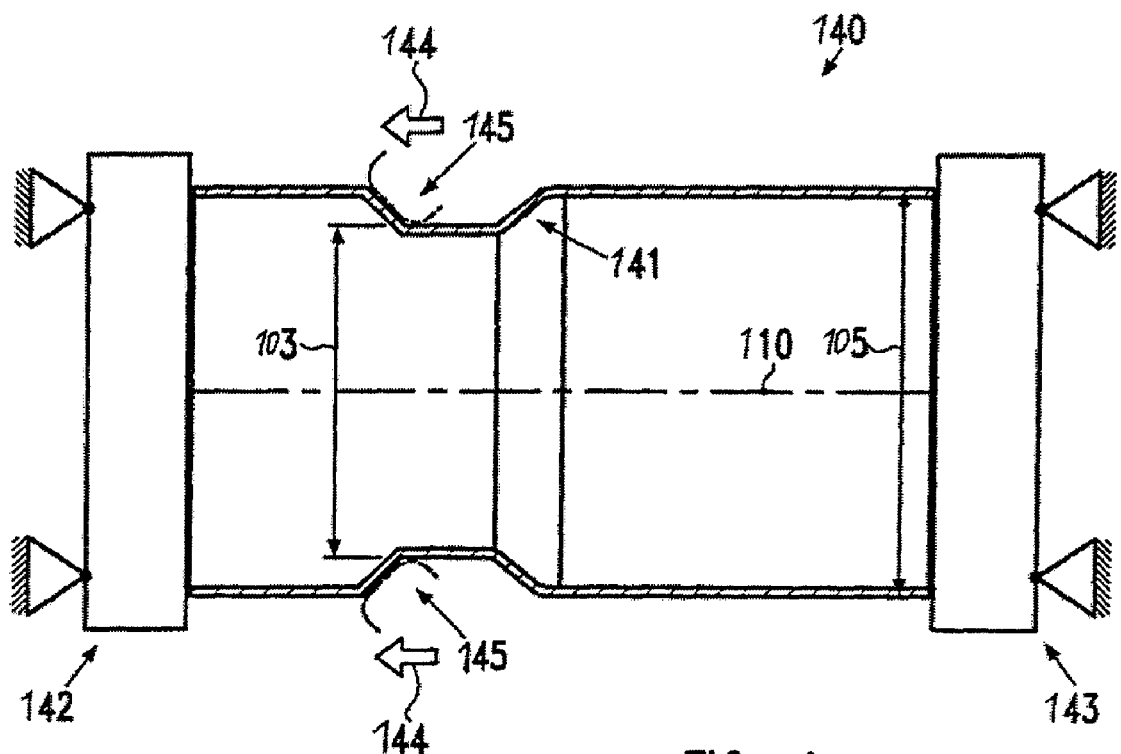
FIGS. 15 and 16 show an illustration of a second embodiment of a manufacturing process according to the invention.
Figure 16:
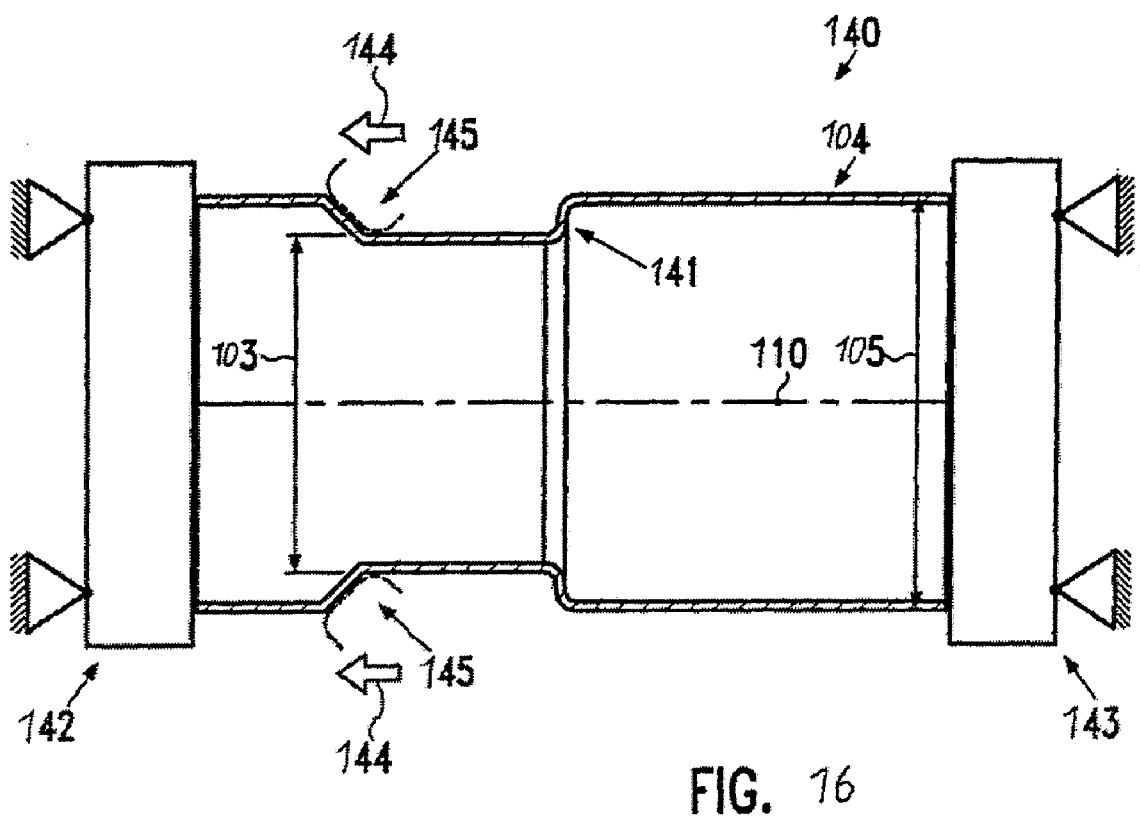

In FIGS. 15 and 16, a second embodiment of the manufacturing process according to the invention is illustrated. Here, a tube 140 is used, which is designed as shown in FIG. 13, however, it has a larger horizontal cross section width. The tube 140 is clamped between axial bearings or brackets 142, 143. With the help of a spinning tool 145 that works in the direction of arrow 144 and is shown in FIG. 15, the horizontal cross section width of tube 140 is narrowed in sections. As a result, a transition section 141 is formed, which at first has a cone-shaped profile in longitudinal cross section.

As a result of the narrowing of the horizontal cross section width, without axial bearing 142, 143, the length of tube 140 would lengthen. However, as axial bearings 142, 143 forces the tube to retain its axial length, the transition section 141 is deformed rolling back. Thus, the formation of an S-shaped or a double-U-shaped transition section is an integrated process in this manufacturing process.

Subsequently, the longitudinal sections 102,104 that were created are obliquely aligned with one another with a tool, whereby the transition area plastically deforms and takes on the form shown in FIGS. 5 to 7.

It is also possible to manufacture the energy absorption device with spinning tools, however, without axial bearings 142, 143. In this process, the transition section 141 is compressed after roller-burnishing as in the first embodiment of the manufacturing process.

The second U-arc 108, i.e. the U-arc that is not intended for rolled-back deformation bordering on the second hollow longitudinal section 104, can be stabilized by a joining process. With that, a deformation is countered at the expense of the second hollow longitudinal section. As joining material, adhesive, welding material or soldering material can be used, which is put into this U-arc 108.

Stabilization by joining has a similar effect as a work-hardening or the provision of a trueing in the second U-arc. These steps can be performed in addition or alternatively.

The work-hardening steps can also be performed on the first U-arc 107, when the second hollow longitudinal section is intended for rolled-back deformation.

The energy absorption device can, for example, be manufactured from steel with induced plasticity. During deformation, they experience a significant increase of extensibility at increased density. In this manner, the energy absorption device can also be manufactured by roller-burnishing by narrowing the horizontal cross section width, whereby the area of narrowed cross section width, i.e. the first hollow longitudinal section still remains the horizontal cross section that is more capable of being rolled back, even though its density increases somewhat as a result of the deformation.

As steels with induced plasticity, LIP steels (light weight steels with induced plasticity) can be used, for example, XIP steels (extremely high strength steels with induced plasticity) or TWIP steels (twinning induced plasticity).

The energy absorption device of the first embodiment of the invention can also be manufactured from the named steels.

It should be appreciated that the foregoing description is illustrative in nature and that the present invention includes modifications, changes, and equivalents thereof, without departure from the scope of the invention.

The invention claimed is:

1. An energy absorption device (1) for a bumper arrangement of a vehicle comprising:
    a hollow longitudinal section (2) having a longitudinal axis (7) and having a length extending along the longitudinal axis (7), the hollow longitudinal section (2) designated for deformation during an energy absorption;
    a mounting section (4) defining a mounting plane (5) of the energy absorption device (1); and,
    a rolled-back section (3) formed between and interconnecting the hollow longitudinal section (2) and the mounting section (4),
wherein a normal (8) of the mounting plane (5) in an initial position prior to the energy absorption is aligned at an oblique angle (9) to the longitudinal axis (7) of the hollow longitudinal section (2).

2. The energy absorption device according to claim 1, wherein one of the longitudinal axis (7) of the hollow longitudinal section (2) and the normal (8) of the mounting plane (5) is aligned at the oblique angle (9) to a longitudinal direction of the vehicle, and the other one of the longitudinal axis (7) of the hollow longitudinal section (2) and the normal (8) to the mounting plane (5) runs substantially parallel to the longitudinal direction of the vehicle.

3. The energy absorption device according to claim 1, wherein the longitudinal axis (7) of the hollow longitudinal section (2) is aligned approximately 5° to 20° oblique to the normal (8) of the mounting plane (5).

4. The energy absorption device according to claim 3, wherein the longitudinal axis (7) of the hollow longitudinal section (2) is aligned approximately 8° to 12° oblique to the normal (8) of the mounting plane (5).

5. The energy absorption device according to claim 4, wherein the longitudinal axis (7) of the hollow longitudinal section (2) is aligned approximately 10° oblique to the normal (8) of the mounting plane (5).

6. The energy absorption device according to claim 1, wherein the mounting plane (5) is aligned approximately perpendicular to a longitudinal direction of the vehicle.

7. The energy absorption device according to claim 1, wherein the rolled-back section (3) has a U-shaped rolled-back form.

8. The energy absorption device according to claim 1, wherein the mounting section (4) is formed as one of a flange-like, a flap-like or a collar-like extension from the rolled-back section (3).

9. The energy absorption device according to claim 1, wherein during use the energy absorption device is mounted to a vehicle structure having a cladding (19), the cladding (19) defining a guide along which the hollow longitudinal section (2) is guided during deformation.

10. An energy absorption device (101) for a bumper arrangement of a vehicle, comprising:

a first hollow longitudinal section (102) with first horizontal cross section width (103), the first hollow longitudinal section (102) having a first longitudinal axis (109) and having a first length extending along the first longitudinal axis (109);

a second hollow longitudinal section (104) with second horizontal cross section width (105), the second hollow longitudinal section (104) having a second longitudinal axis (110) and having a second length extending along the second longitudinal axis (110); and a rolled-back transition section (106) formed between and interconnecting the first hollow longitudinal section (102) and the second hollow longitudinal section (104), wherein the first longitudinal axis (109) of the first hollow longitudinal section (102) in an initial condition prior to energy absorption is aligned at an oblique angle (111) to the second longitudinal axis (110) of the second hollow longitudinal section (104).

11. The energy absorption device according to claim 10, wherein the vehicle has a longitudinal direction, and wherein the first hollow longitudinal section (102) is aligned oblique to the longitudinal direction of the vehicle.

12. The energy absorption device according to claim 10, wherein the first horizontal cross section width (103) is smaller than the second horizontal cross section width (105).

13. The energy absorption device according to claim 12, wherein an inner surface of the second hollow longitudinal section (104) forms a guide for the first hollow longitudinal section (102).

14. A process for the manufacture of a one piece energy absorption device (101), which is provided with a first hollow longitudinal section (102) with a first horizontal cross section width (103) and a second hollow longitudinal section (104) with a second horizontal cross section width (105) as well as a rolled-back transition section (106) between the two hollow longitudinal sections, the process comprising the following steps:

in sections changing the horizontal cross section width of a tube (130, 140) with first horizontal cross section width to the second horizontal cross section width by forming the hollow longitudinal sections (102, 104) with first and second horizontal cross section width (103, 105) and compressing the tube (130, 140) to form the rolled-back transition section (106), and wherein the hollow longitudinal sections (102, 104) are aligned oblique to one another.

15. The process according to claim 14, wherein the tube (130) with first horizontal cross section width (103) is increased in sections to the second horizontal cross section width (105) using an interior high pressure deformation process.

16. A one-piece energy absorption device (1, 101) for a bumper arrangement of a vehicle, the energy absorption device (1, 101) fabricated from a plastically deformable material, and comprising:

a hollow longitudinal section (2, 102) that is designated for deformation;

an extension section (4, 104); and, a rolled-back section (3, 106) that is formed from the plastically deformable material disposed between the hollow longitudinal section (2, 102) and the extension section (4, 104), wherein an amount of the plastically deformable material that is rolled back is different in different portions of the rolled-back section (3, 106) such that the rolled-back section (3, 106) defines an oblique angle between the hollow longitudinal section (2, 102) and the extension section (4, 104).

* * * * *